Oct. 16, 1956 E. J. MARTIN ET AL 2,766,653
RADIANT ENERGY TRANSMISSION AND REFLECTION ANALYZER
WITH ADJUSTABLE FILTER
Original Filed Sept. 23, 1947 4 Sheets-Sheet 1

Inventors
Edward J. Martin &
Robert N. Frawley
Spencer, Willits, Helmig & Baillie
Attorneys Oct. 16, 1956 E. J. MARTIN ET AL 2,766,653
RADIANT ENERGY TRANSMISSION AND REFLECTION ANALYZER
WITH ADJUSTABLE FILTER
Original Filed Sept. 23, 1947 4 Sheets-Sheet 2

Inventors
Edward J. Martin &
Robert N. Feawley
Spencer, Willets, Helmig & Baillie
Attorneys Inventors
Edward J. Martin &
Robert N. Frawley
Spencer, Willits, Kelzing & Baillie
Attorneys

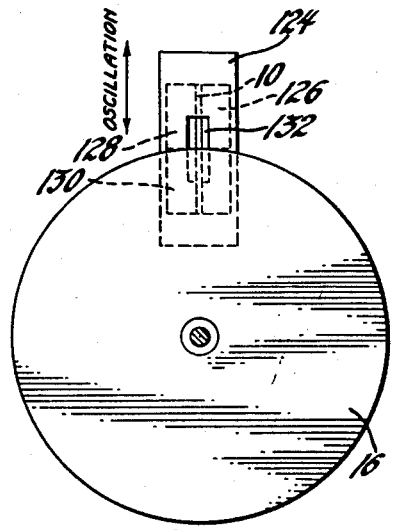
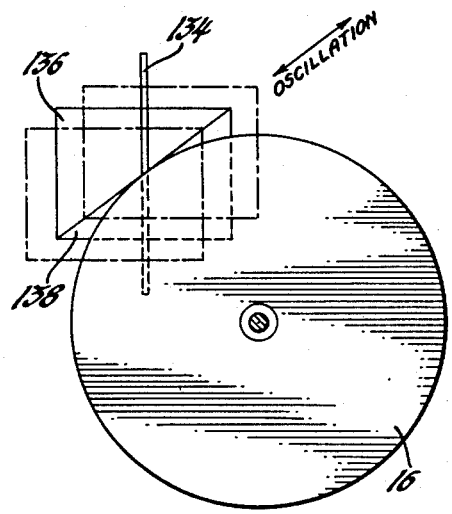
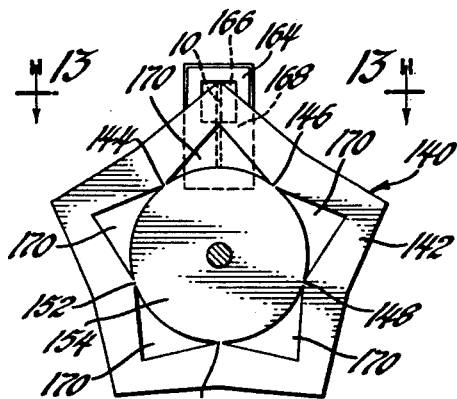
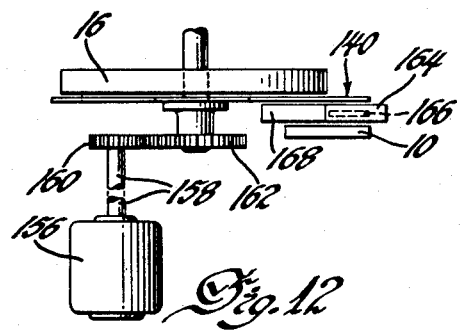
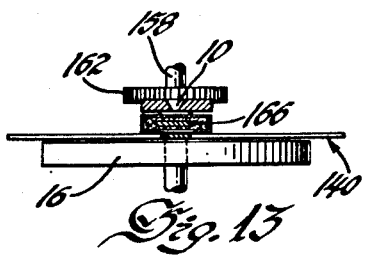

United States Patent Office 2,766,653
Patented Oct. 16, 1956

2,766,653

RADIANT ENERGY TRANSMISSION AND REFLECTION ANALYZER WITH ADJUSTABLE FILTER

Edward J. Martin, Pleasant Ridge, Mich., and Robert N. Frawley, El Monte, Calif., assignors to General Motors Corporation, Detroit, Mich., a corporation of Delaware Original application September 23, 1947, Serial No. 775,666, now Patent No. 2,589,414, dated March 18, 1952. Divided and this application January 11, 1952, Serial No. 270,053

8 Claims. (Cl. 88—14)

This application is a division of my copending application Serial No. 775,666, filed September 23, 1947, Patent No. 2,589,414, issued March 18, 1952, and the present invention relates to radiant energy transmission and reflection comparison methods and apparatus. More particularly it relates to a radiation and transmission analyzer of the type in which a standard material is compared with a test specimen using an adjustable neutral filter.

Previous to the present invention the necessity of taking a large number of readings independently both through a standard material and the test material and mathematically correlating the results of these various readings has made radiation and transmission analysis quite complicated and difficult.

The present invention makes possible the automatic comparison of the energy transmission, or reflection of, a standard material, or surface, and the specimen under test. The present invention utilizes a variable neutral filter interposed between the source of radiation, and the standard material or specimen under test (depending on which has the greater transmission or reflection coefficient). The energy source, test specimen, standard material, variable filter and radiation receiver are so arranged that the energy is first radiated through the standard material and then through the test specimen, the received energy is compared, the variable filter placed between the energy source and either the standard material or specimen under test and adjusted by means of a servo mechanism so that the energy received is substantially constant at all times. The filter adjustment may be calibrated to indicate the relative transmission or reflection of the specimens.

It is therefore an object of the present invention to provide a simple and efficient means for comparing energy transmission and/or reflectivity.

It is a further object of the present invention to provide a neutral, adjustable, raster or filter.

It is a still further object of the present invention to provide a radiation and transmission analyzer in which the energy source is first concentrated on one material and then on a second material plus a neutral filter and the received energy analyzed so as to determine the relative transmission or reflection of the materials.

It is a still further object of this invention to provide a simple, efficient and accurate infrared ray analyzer.

Other objects of this invention will become apparent upon reading the specification and inspection of the drawings and will be particularly pointed out in the claims.

Referring to the figures in the drawings.

Figure 9 is a diagrammatic view of an arrangement, in accordance with the present invention, of the filter and the standard and test specimens wherein the specimens are adapted to be oscillated radially with respect to the filter. Figure 10 is a diagrammatic view of a further arrangement, in accordance with the invention, of the filter and the standard and test specimens wherein the specimens are adapted to be oscillated tangentially to the filter.

Figure 11 shows a modification of the filter.

Figure 12 is an elevational view of Figure 11.

Figure 13 is a partial sectional view taken along the line 13—13 of Figure 11.

Figure 1:
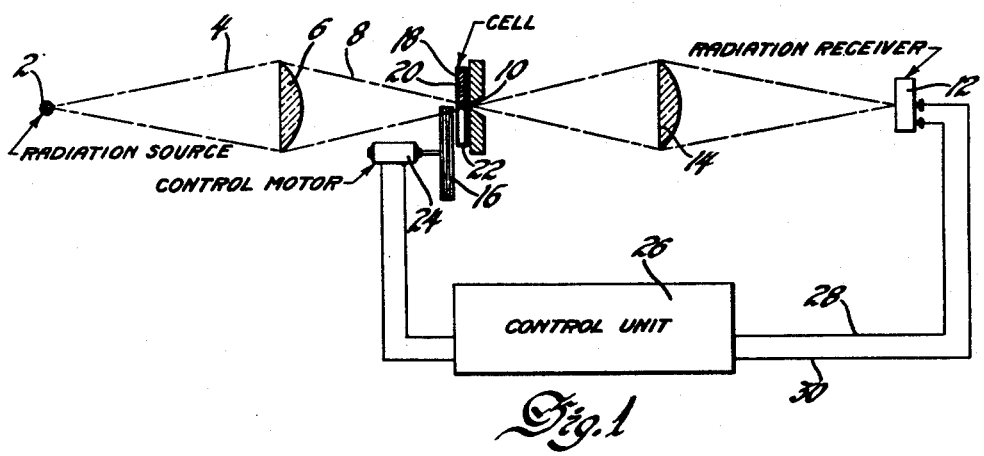
Figure 1 is a schematic diagram of one modification of the present invention.
Figure 2:
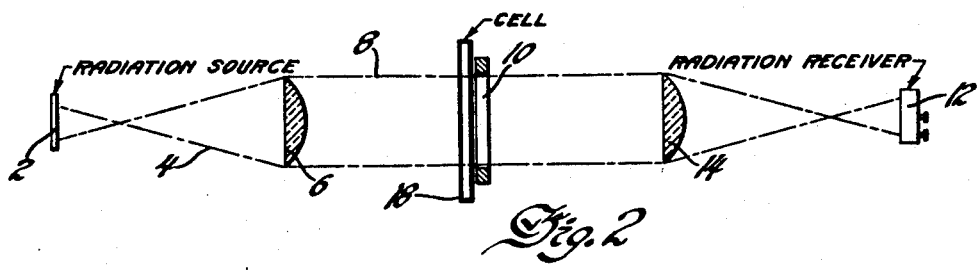
Figure 2 is a cross section of the optical system of Figure 1 taken 90° to the plane shown in Figure 1.

Referring more particularly to Figures 1 and 2, the source of energy radiation 2 is illustrated as a line source. The energy from this source is projected along the direction 4 to the spherical convex lens 6. This lens projects the energy along the lines 8 through the slit 10 in the radiation analyzer. The energy after passing through the slit 10 is projected on to the radiation receiver 12 by means of a second lens 14. A neutral filter 16 of known and adjustable density, plus a cell 18 containing a test specimen 20 and a standard specimen 22 of known transmission characteristics, is interposed between the lens 6 and the slit 10 in the energy analyzer. The filter 16 plus the cell 18 is oscillated transversely of the slit 10 so as to compare the energy transmission through that slit. As illustrated in the modification of the present invention shown in Figures 4, 5 and 6, the neutral filter is a rotating disk with controllable segmental openings. This filter is adjusted by means of control motor 24 in such a manner that when in balance the energy received by the radiation receiver 12 is substantially constant. It is desirable but not necessary that the configuration of the cell 18 containing the test specimen and standard be such and its movement so correlated that the energy received by the receiver 12 will approximate a sine wave. The energy received by this receiver will, of course, be constant when the system has been completely balanced by the proper adjustment of the filter 16 by the motor 24. In order to obtain this proper adjustment the energy received by the radiation receiver is transformed by the receiver into electrical energy and transmitted to the control unit 26 by means of wires 28 and 30. This control unit 26 contains the proper amplifier, phase differentiator and control circuits to energize and cause motivation of the control motor 24 when the energy received by the radiation receiver 12 is oscillating. The armature of this control motor 24 is thereby rotated and adjusts the filter 16 to such a point that the energy received by the radiation receiver 12 is constant. It may be found desirable to drive an indicating or recording instrument 200 to automatically determine or record the degree of transmission of the filter and thus indicate or record the transmission ratio between the standard and test specimen at any and all desired frequenices within the range for which the system is designed to operate.

Figure 3:
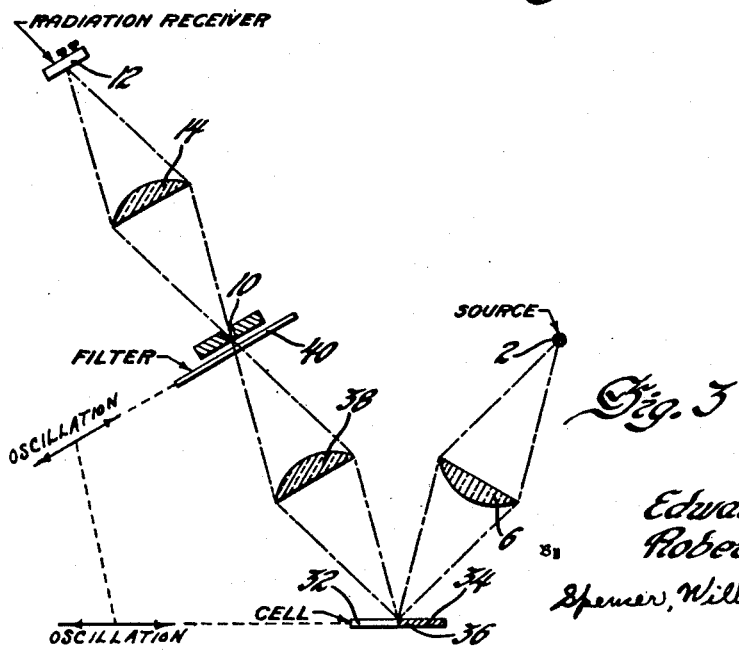
Figure 3 is a schematic showing of the present invention used to compare reflectivity.

Figure 3 shows the present invention used to compare reflectivity of a standard coating 32, and a test coating 34 on a cell 36. In this modification of the invention the source 2, the lens 6, the slit 10, the lens 14, and the radiation receiver 12 may be the same as, or similar to those used in the modification of this invention shown in Figures 1 and 2. In order, however, to obtain the proper control and concentration of the rays of energy an additional optical system including lens 38 must be interposed between the cell 36 and the filter 40. The filter 40 in this modification of the invention may be of the same general type as that shown in Figure 1 and may be controlled in the same general manner. In this modification, however, the cell and filter must be oscillated in phase as indicated by the arrows in Figure 3 but depending on the optical system used, they may or may not be actuated in the same plane. This modification of the present invention is very useful in the comparison of various coating colors and degrees of polish. This modification, for example, is useful in matching paints or other finishes. It is also very useful in comparing the condition of polish, or degree of roughness, of a finished surface.

Figure 4:
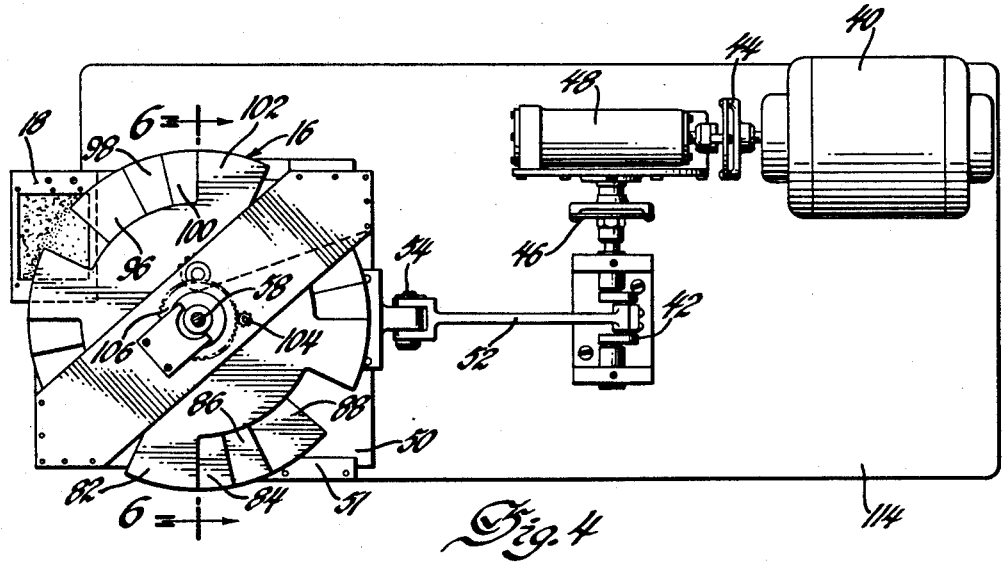
Figure 4 is a plan view of the controllable filter or raster with the associated mechanism for oscillating the specimens and filter.

Referring to Figure 4, the variable filter 16 is illustrated as containing a series of metallic or other opaque disks having openings therein and so arranged with each other that these openings register to permit the transmission of light in variable amounts up to 75 percent complete transmission, while the entire system of plates is rotated at high speed. The speed of rotation of these plates and hence the rapidity at which the light through the cell is changed must be very great as compared to the speed at which the cell is shifted in front of the slit in the analyzer. This is necessary in order that any pulsation in energy caused by the segments may be easily filtered by the radiation receiver and/or control unit. The entire raster unit, including the rotating filter and also the cell 18, is oscillated in front of the slit of the analyzer by reciprocating the assembly including these members by means of a crank and connecting rod assembly. A motor 40 is connected to the crank 42 by means of couplings 44 and 46 and gear box 48. This crank 42 which is directly connected to the coupling 46, is connected to the plate 50 by means of connecting rod 52 and crosshead pin 54.

Figure 5:
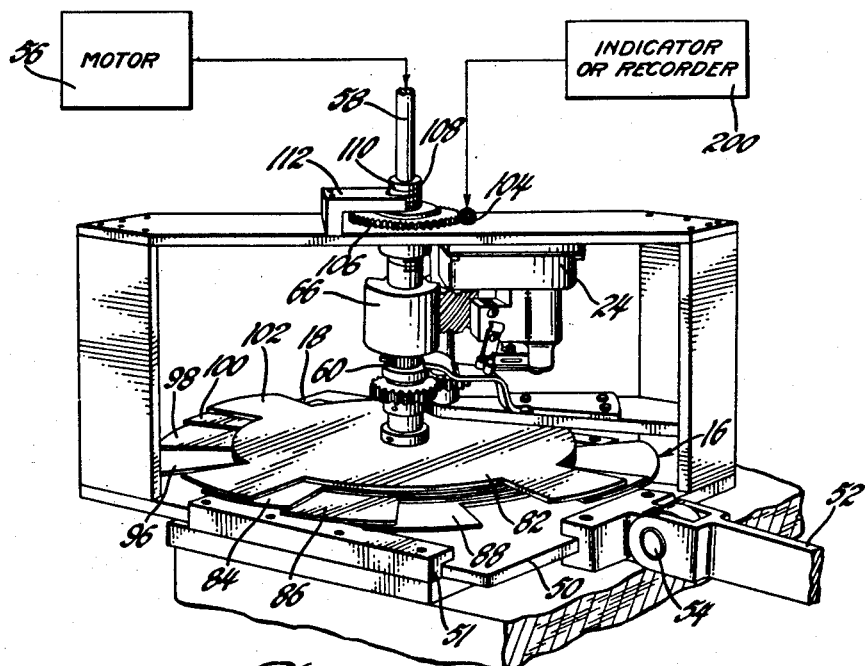
Figure 5 is a more detailed view of the controllable filter and oscillating mechanism.

Referring to Figure 5, the plate 50 is reciprocated in guide 51 carrying the entire assembly with it. As the assembly is reciprocated, a motor 56 rotates the disks of the filter 16 at high speed.

Figure 6:
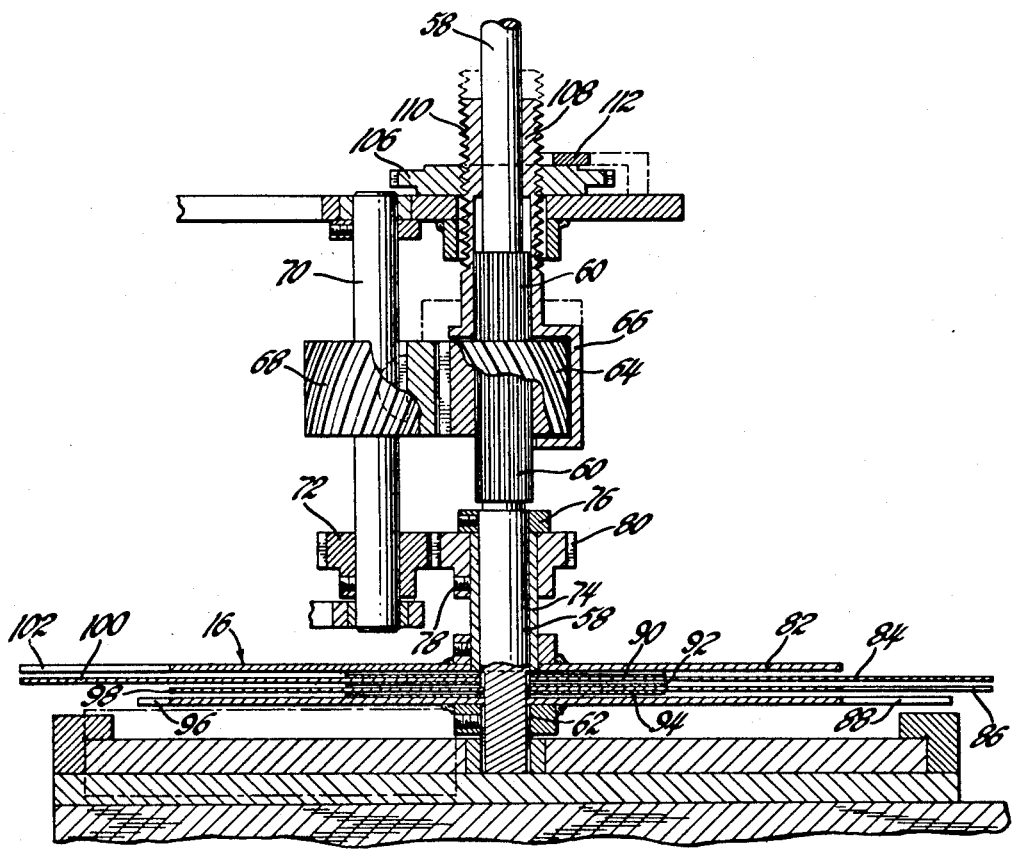
Figure 6 is a partial sectional view taken along the line 6—6 of Figure 4.

Referring to both Figures 5 and 6, the motor 56 is connected to a shaft 58 having splines 60 and 62 thereon. The splines 60 carry a spiral gear 64. This spiral gear 64 has freedom of axial movement on the splines 60 and is adjusted at the desired axial location by means of carrier 66. The spline gear 64 drives a mating gear 68 on a small jack shaft 70. This spiral gear 68 is rigidly attached to the shaft 70 as is also the spur gear 72. The shaft 58 also has mounted thereon a tubular member 74 having freedom of rotary movement with regard to said shaft 58 but mounted in a fixed axial position by collar 76. Rigidly mounted on the tubular member 74 by means of a set screw 78 is a spur gear 80 so positioned as to mate with spur gear 72 on jack shaft 70. The pitch diameter of the gears 68 and 72 must be the same and also that dimension of the gears 64 and 80 must be identical. It may be seen that by thus proportioning the dimensions of these gears that gear 64 and gear 80 rotate at exactly the same speed to maintain a fixed relation with each other until the gear 64 is moved in an axial direction on the shaft. The rotating raster or filter 16 is made up of plates 82, 84, 86 and 88. These plates have spacers 90, 92 and 94 therebeweteen to permit the adjustment of their position relative to each other. The tube 74 is connected directly to the plate 82 while the shaft 58 through spline 62 is conneced to plate 88 of the raster. As the angular position of 82 is changed relative to 88 the plates 84 and 86 fan out so as to change the relationship of the openings between the disks. In one extreme position the segments 96, 98, 100 and 102 are all aligned with each other so that during approximately 75 percent of the rotation of the assembly rays are permitted to pass through the filter and during the other 25 percent of the time the rays are blocked by this segment. In the other extreme position the segments 96, 98, 100, 102 are fanned out with regard to each other so that the assembly 16 is a solid disk as far as the rays are concerned and no energy may be transmitted through the filter. It may thus be seen that as the disk 82 is moved relative to the disk 88 the amount of transmission may be adjusted from the zero to 75 percent of the total transmission. This adjustment is automatically made by the energization of motor 24 through the control unit 26. The motor 24 is connected through a small spur gear 104 to a much larger spur gear 106 carried concentric with the shaft 58. Also mounted concentric to the shaft 58 is the tubular section 108 of the carrier 66. This tubular section has threads 110 of the desired lead angle cut thereon. The spur gear 106 has a mating female thread portion. The spur gear or nut 106 is prevented from axial movement by a collar member 112. It may thus be seen that as the motor 24 turns the spur gear 106, through gear 104, the carrier 66 is raised or lowered depending upon the direction of rotation of the motor. As the carrier 66 is raised or lowered it moves spiral gear 64 axially. As this gear is raised or lowered, the gear 68 is rotated relative to the shaft 58 an amount dependent upon the lead angle of the spiral gear. It may thus readily be seen that as the motor 24 causes the raising or lowering of the gear 64 with its attendant rotation of the gear 68, that the angular position of the disk 82 with respect to disk 88 is changed a proportionate amount. Therefore, the rotation of the motor causes the adjustment of the segments 96 through 102 which determine the coefficient of transmission of the filter system.

As discussed above there are three simultaneous motions in this mechanical system. First, the motor 56 rotates the raster assembly 16 at a very high speed causing this assembly to act as a neutral filter. Second, the motor 40, through gear box 48 and crank 42, drives the entire assembly including the cell 18 in a reciprocating motion so that the test specimen 20 and the standard 22 are alternately placed over the slit 10. By this action the radiation receiver 12 first receives energy through the specimen 20 and then through specimen 22 plus the filter 16. Third, if the energy received through each of these systems is not identical an alternating voltage is produced by the radiation receiver 12. This voltage is amplified and converted into a control voltage by a control unit 26 so as to energize the control motor 24. The control motor 24 through the mechanical system mentioned above, adjusts the position of the segments 96, 98, 100 and 102 so that the energy transmitted through the combined filter and one specimen is identical to that transmitted through the other specimen. When this occurs the energy received by the radiation receiver 12 is the same regardless of the position of the cell 18.

If desirable, the motor 24 may be caused to drive an indicator or recorder of the standard type 200 through a separate gear train. In this way the transmission coefficient of the filter and thereby the difference of transmission between the unknown and standard specimen may be directly determined and/or recorded.

The entire assembly described above is mounted on a plate 114 which plate is fastened rigidly relative to the slit 10 in the analyzer.

Figure 7:
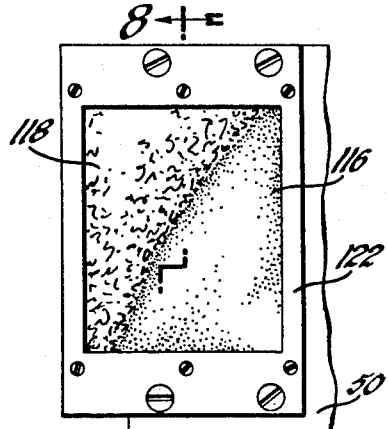
Figure 7 is a plan view showing the method of mounting the standard and the test specimens.
Figure 8:
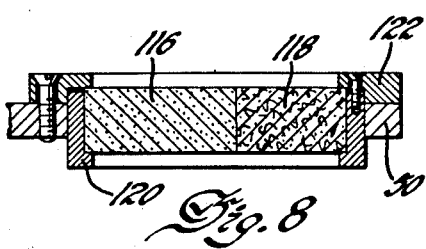
Figure 8 is a sectional view along line 8—8 of Figure 7.

Referring to Figures 7 and 8, details are shown of one method of mounting a standard specimen of known transmission characteristics, and a test specimen, the characteristics of which it is desired to determine. It may be well to here note that the specimen, whether standard or unknown, having the lower coefficient of energy transmission is in the position, here shown as 118, while the other specimen having the greater coefficient of transmission is always mounted in position shown as 116.

These specimens are placed in a container 120 and held in place on a slide 50 by means of a retaining plate 122. In one specific analysis to which this invention has been applied, the standard specimen was rock salt and this specimen was mounted in the position shown in Figures 7 and 8, as 116. It is, of course, within the ordinary application of applicants' invention to change various details and use various standard specimens without departing therefrom.

Referring to Figure 9, the modification of the applicants' invention as here illustrated makes it unnecessary to drive the rotating filter and the specimens under test with a reciprocating motion. In this modification the slit 10 in the analyzer is coveerd by a mask 124 which is driven in a reciprocating motion axially to the rotating filter 16. The cell, here shown as 126, contains specimens 128 and 130, one of which has known transmission characteristics. In this modification the rotating filter 16 at all times masks the specimen 130 and the energy is directed alternately through specimens 128 and 130 by means of the reciprocation of the mask 124 having therein a window 132. It may thus be seen that energy, by the oscillation of window 132, is first transmitted through one specimen and then the other. This modification has the advantage of reducing the reciprocating mass and thus reducing vibration.

Referring to Figure 10, a modification of the applicants' invention is illustrated with a stationary analyzer slit 134 and rotating filter 16. In this modification the rectangular cell is divided into triangular compartments 136 and 138. This cell is driven with a reciprocating motion tangential to the rotating filter. It may thus be seen that as the cell as moved tangential to the filter the energy is first transmitted through the specimen 136 and then through the specimen 138 plus the filter 16.

Another modification of the present invention having no parts moving with a reciprocatory motion is illustrated in Figures 11, 12 and 13. This modification is the preferred form of the present invention. The rotary shutter 140 in this modification replaces the reciprocating motion necessary in the other modifications to transfer energy first through one speciment and then through the other. The shutter 140 has a solid web 142 connected at points 144, 146, 148, 150 and 152 to an inner solid disklike center portion 154. This outer solid portion 142 is so designed that its radial dimension is always constant. This shutter is mounted concentric with the rotating filter 16 but is rotated at a much lower speed than this filter. This shutter transfers the beam of energy from one specimen to the other at a rate of five cycles per revolution. It is, therefore, necessary to rotate the shutter at only a very low speed to obtain an output frequency that is convenient to filter and convert into a control voltage. In this modification the shutter is driven by a motor 156 through a shaft 158 and spur gears 160 and 162. In this modification the specimen is mounted in a container 164 having compartments 166 and 168. As the shutter 140 rotates, the specimens 166 and 168 are alternately exposed to the transmission of energy. This energy is, of course, focused on the specimen in the same manner as previously described and the slit 10 as previously described permits the transmission of energy into the spectrograph.

The operation of the device above described is as follows:

Referring to Figures 1 and 2, the energy is transmitted from a radiating filament or ribbon 2 through a lens system 6 onto the cell 18. This energy is projected through one specimen of lower light transmission and then through the other specimen plus the filter alternately at the frequency desired for the operation of the control unit 26. This alternate projection is accomplished in Figures 4, 5 and 6 by means of the reciprocation of the filter and specimens. It is accomplished in Figure 9 by the reciprocation of a mask 124.

In Figure 10 this alternate projection of energy is accomplished by the tangential oscillation of the container holding specimens 136 and 138. In Figures 11, 12 and 13, the preferred form of this invention, the alternate transmission of light is accomplished by means of a rotating shutter or disk 140 having a special external configuration and specially cut openings 170. The energy, after being transmitted through the two specimens alternately, is focused on a radiation receiver 12. The output of this radiation receiver is then transmitted to the control unit 26 where it is transformed into a control voltage. This control voltage causes the actuation of the motor 24 so that it properly adjusts the filter disks, 82 through 88. In the operation of this device it is desirable to start the test with the filter in the fully closed position. The ratio of light transmission between the known and unknown specimen may be readily determined and hence the absolute energy transmission characteristics may be determined by the position of the disks of the filter under balanced condition. It is desirable that a standard type recording instrument, for example 200, be attached to this filter system preferably by means of spur gear 104 or 106 in order that the determination and recording of the transmission characteristics of the material will be fully automatic.

The present invention is considered equally applicable to the measuring of reflection characteristics throughout the infrared to ultraviolet frequency band. The same equipment may be used for both transmission and reflection measurements with the exception that the optical system must be modified as shown in Figure 3. With the optical system so modified, cell 36 with specimens 32 and 34 are oscillated in synchronism and the amount of reflective energy is received by the radiation receiver 12 and used to control the filter 40 in the same way it is used to control filter 16 described above.

Having thus described the present invention, it is obvious that various modifications within the knowledge of workers in the art may be utilized without departing therefrom.

It is to be understood also that although the invention has been described with specific reference to a particular embodiment thereof, it is not to be so limited, since changes and alterations therein may be made which are within the full intended scope of this invention as defined by the appended claims.

We claim:

1. Apparatus for comparing the energy reflection characteristics of two surfaces, including a source of energy for projecting a radiant beam, means for focusing the radiant energy beam on the two surfaces, means for receiving the reflected radiant energy from said two surfaces, an adjustable neutral filter between said source and said surface appearing to have the greater characteristic of reflection of the two surfaces, means for oscillating the specimens and the filter in phase so as to have the radiant beam transmitted alternately by the two surfaces, means responsive to the received radiant energy from the two sources for adjusting the neutral filter so that the two received alternate components of energy are equal.

2. In apparatus for comparing the radiant energy reflective characteristics of two surfaces having different energy reflective characteristics, including a source of energy, an adjustable neutral filter consisting of a series of overlapping rotating disc sectors, the magnitude of overlap of which is adjustable, placed over the one of the surfaces having the greater radiant energy reflective characteristic, means for reciprocating said surfaces and associated filter so as to cause the radiant energy from said source to be focused alternately upon the surface having the lesser radiant energy reflective characteristic and upon the surface having the greater energy reflective characteristic plus said filter, an energy receiving means capable of transforming radiant energy into an electrical signal, means for focusing said energy from the surface in the radiant energy path onto said energy receiving means, and electrical indicating means connected to the energy receiving means for determining the change in amplitude of said electrical signal as the energy is reflected alternately from said surfaces.

3. In apparatus for comparing the radiant energy reflective characteristics of two surfaces having different radiant energy reflective characteristics, including, a source of energy, an adjustable neutral filter consisting of a series of overlapping rotating disc sectors, the magnitude of overlap of which is adjustable, placed over the one of the surfaces having the greater radiant energy reflective characteristic, means for reciprocating said surfaces and associated filter so as to cause the radiant energy from said source to be focused alternately upon the surface having the lesser radiant energy reflective characteristic and upon the surface having the greater energy reflective characteristic plus said filter, an energy receiving means capable of transforming radiant energy into an electrical signal, means for focusing said energy from the surface in the radiant energy path onto said energy receiving means, means for automatically adjusting the overlap of the disc sectors of said filter responsive to the change in amplitude of said electrical signal so that equal radiant energy is reflected from both surfaces.

4. In apparatus for comparing the radiant energy reflective characteristics of two surfaces having different radiant energy reflective characteristics including a source of energy, an adjustable neutral filter consisting of a series of overlapping rotating disc sectors the magnitude of overlap of which is adjustable, placed over the one of the surfaces having the greater radiant energy reflective characteristic, means for reciprocating surfaces and associated filter so as to cause the radiant energy from said source to be focused alternately upon the surface having the lesser radiant energy reflective characteristic and upon the surface having the greater radiant energy reflective characteristic plus said filter, an energy receiving means capable of transforming radiant energy into an electrical signal, means for focusing said energy from the surface in the radiant energy path onto said energy receiving means, an electrical motor connected to said filter and capable of causing adjustment thereof by adjusting the overlap of said disc sectors, a control circuit connected to the output terminals of said energy receiver so as to receive an electrical signal therefrom and produce a control voltage capable of energizing said electrical motor to cause said motor to actuate the filter and thereby cause adjustment of the disc sector overlap thereof so that equal amounts of radiant energy are reflected from said surfaces.

5. In apparatus for comparing the radiant energy reflective characteristics of two surfaces as claimed in claim 4, with means for indicating the degree of energy transmission permitted by said adjustable filter.

6. In apparatus for comparing radiant energy reflective characteristics as claimed in claim 4, with means for recording the degree of energy transmission permitted by said adjustable filter and thereby recording the ratio of the energy reflective characteristics of said surfaces.

7. In apparatus for comparing the radiant energy reflective characteristics of two surfaces having different radiant energy reflective characteristics including, a source of energy, an adjustable neutral filter placed over the one of the surfaces having the greater radiant energy reflective characteristic, means for reciprocating the surfaces and associated filter so as to cause the radiant energy from said source to be focused alternately upon the surface having the lesser radiant energy reflective characteristic and upon the surface having the greater energy reflective characteristic plus said filter, an energy receiving means capable of transforming radiant energy into an electrical signal, means for focusing said energy from the surface in the radiant energy path onto said energy receiving means, and means for automatically adjusting said filter responsive to the change in amplitude of said electrical signal so that equal radiant energy is transmitted from both surfaces.

8. In apparatus for comparing the radiant energy reflective characteristics of two surfaces having different energy reflective characteristics including, a source of energy, an adjustable neutral filter consisting of a series of overlapping rotating disc sectors, the magnitude of overlap of which is adjustable, placed over the one of the surfaces having the greater radiant energy reflective characteristic, means for reciprocating said surfaces and associated filter so as to cause the radiant energy from said source to be focused alternately upon the surface having the lesser radiant energy reflective characteristic and then upon the surface having the greater energy reflective characteristic plus said filter, an energy receiving means capable of transforming radiant energy into an electrical signal, means for focusing said energy from the surfaces in the radiant energy path onto said energy receiving means, and means for adjusting the overlap of the disc sectors of said filter responsive to the change in amplitude of said electrical signal so that equal radiant energy is reflected from both surfaces.

References Cited in the file of this patent

UNITED STATES PATENTS

| | | |
|---|---|---|
| 1,374,965 | Tate | Apr. 19, 1921 |
| 1,860,967 | Tate | May 31, 1932 |
| 1,919,182 | Fitz Gerald | July 18, 1933 |
| 1,999,023 | Sharp et al. | Apr. 23, 1935 |
| 2,166,947 | Fayerweather | July 25, 1939 |
| 2,312,010 | Akker | Feb. 23, 1943 |
| 2,413,080 | Seeley | Dec. 24, 1946 |
| 2,494,440 | Haynes | Jan. 10, 1950 |

FOREIGN PATENTS

| | | |
|---|---|---|
| 747,498 | Germany | Sept. 27, 1944 |